United States Patent [19]
Ziegelmeyer

[11] 3,760,935
[45] Sept. 25, 1973

[54] PUSHER LUGS FOR CONVEYORS
[76] Inventor: Harold R. Ziegelmeyer, 5010 Griffin Creek Rd., Medford, Oreg. 97501
[22] Filed: June 23, 1972
[21] Appl. No.: 265,610

[52] U.S. Cl. .................................. 198/173, 198/168
[51] Int. Cl. ............................................ B65g 19/00
[58] Field of Search .................... 198/168, 172, 173, 198/175, 176, 200, 171

[56] References Cited
UNITED STATES PATENTS
1,944,374  1/1934  Schmidtke .......................... 198/173

Primary Examiner—Richard E. Aegerter
Assistant Examiner—Joseph E. Valenza
Attorney—Clarence M. Crews

[57] ABSTRACT

The present invention has to do with longitudinally adjustable pusher lugs for conveyors, the lugs being adapted for use as original equipment or as replacements for presently conventional, adjustable pusher lugs which cannot be depended upon to hold their adjustments for any extended period. The present lug includes a base or mounting member adapted for fixed attachment to the conveyor but never intended to engage a work piece, and a pusher member clamped thereto with capacity for longitudinal adjustment relative to the mounting member. Both members are formed with numerous longitudinally extending ridges of like trapezoidal cross-section, the sloping sides of adjacent ridges forming V-shaped channels between them.

3 Claims, 8 Drawing Figures

INVENTOR:
HAROLD R. ZIEGELMEYER
by: Clarence M. Crews
HIS ATTORNEY

INVENTOR:
HAROLD R. ZIEGELMEYER
HIS ATTORNEY

PUSHER LUGS FOR CONVEYORS

This invention relates to improved adjustable pusher lugs for conveyors which are in the nature of an improvement upon, or a supplement to, the pusher lugs disclosed and claimed in my co-pending application for Pusher Lugs for Conveyors, Ser. No. 232,553, filed Mar. 7, 1972. Although the present lugs, like the lugs of said application, have many uses, they are illustratively shown and described herein with reference to the pushing of unblemished, random length stud scraps through a conventional machine which forms wedge-shaped tongues and grooves of predetermined, uniform shape and uniform depth in the ends of the stud scraps, so that the scraps may be firmly and accurately, adhesively united end to end in precisely aligned relation to form composite studs of any desired lengths. The resulting composite studs, being straight, precisely interfitted, and completely free from knots and cracks, are of the highest quality.

For acceptable results, it is imperative that the stud scraps have precisely squared ends preliminary to slotting, and that the wedge-shaped slots and tongues be all of precisely predetermined, uniform depth, so that the united scraps may be snugly and completely interfitted, and will not be out of line with one another. This demands that the stud scraps be pushed past the saws precisely at right angles to their lengthwise dimensions. Each pusher lug, therefore, must be precisely adjustable lengthwise of the conveyor and must be capable of dependably holding its adjustment.

In the conventional machine, random length scraps, having precisely squared ends, are manually laid crosswise upon a frame-supported or table-supported, continuously traveling chain link conveyor which comprises two parallel chains. With their left ends aligned, the scraps are advanced under a frictional drag, followed by a firm clamping pressure, to and past one set of slotting saws, which saws form the requisite wedge-shaped slots in the left ends, leaving the requisite wedge-shaped tongues intact.

The scraps are then automatically readjusted laterally on the traveling conveyor, to align the right ends, being further advanced under frictional pressure, followed by a firm clamping pressure, to and past a second set of slotting saws which form the requisite, complementary wedge-shaped slots and tongues in the right ends. Adhesive is then sprayed into the right end slots and the pieces are discharged, ready for prompt endwise feeding into a joining machine which fits the pieces snugly and firmly together endwise, and, depending on the setting of the machine, automatically saws them into eight foot, twelve foot, or sixteen foot lengths. The lengths can be further varied if desired.

The conveyor referred to desirably consists of two parallel chains, sprocket driven in unison from the leading end of the conveyor, with corresponding links rigidly connected by crossbars. Each crossbar serves as, or is caused to provide, a fixed, central pusher. Right and left adjustable pusher lugs, mounted on the crossbar-connected links, are adapted to have their leading faces operatively aligned with the forward boundary of the fixed central pusher or lug. It is the conventional, adjustable lugs which my novel lug is designed to replace.

Each conventional, adjustable lug comprises two principal parts, namely, a base member, having as an integral part a projecting lower rib which fits into a longitudinal channel of the lug-supporting chain link, and an upstanding pusher member which is slidably mounted for fore-and-aft adjustment upon and relative to the base member of the lug. The base member is fixed in position on the chain link by two headed screws and the integral rib.

The pusher member of the conventional lug is mounted on a raised side portion of the base member by two headed screws whose shanks pass laterally and freely, through longitudinally extending slots formed in the raised portion of the base member. The forward end of each pusher member is always adjusted to stand ahead of the leading ends of the base members by which they are carried. Each pusher member is limited in its retreat by an adjustable stop screw, the stop screw being threaded into the pusher member from the rear for engagement with the shank of one of the mounting screws. When the stop screw has been satisfactorily set, to align the leading face of the pusher member with the leading face of the fixed central pusher provided by the crossbar, the headed mounting screws are tightened to bind the pusher member in this determined position.

This type of control is very undependable. Even though the stop screw is of very low pitch, having a slope well within the angle of repose, the vibration and jolts to which it is subjected cause it to creep away from its assigned position, and the mere frictional hold of the mounting screws is inadequate. It is standard practice, therefore, in factories employing the described equipment, to recheck and correct loss of adjustment of the pusher members once for every eight-hour shift of duty. Such recheck and correction of a single machine ordinarily occupies the checker for substantially the full meal period of the machine operator.

Certain features of improvement embodied in the lug of my prior application are also included in the present improved structure. They will be referred to in the detailed description but will not be explained at this point.

The salient feature of novelty of the present invention resides in the provision of an improved structure for fixing the position of the pusher member of the lug relative to the base member thereof.

In the lug of my prior application a broad and deep dovetail rib is provided on the bottom of the pusher member to lie in a still broader channel of the base member. A wedge block is forced down into the remaining portion of the channel by means of headed screws. This construction has been accepted commercially in many quarters and it has been found to function in a highly satisfactory manner when substituted in conventional machines to which it is applicable. It has been found, however, that there are many conventional machines to which it cannot be applied because the combined width of the dovetail rib and the wedge block compel a total width of the lug greater than that which can be accommodated between the base block mounting screws and the cutting edges of the saws.

It is the primary purpose of the present invention to overcome this difficulty by providing a novel pusher lug which comprises a base block and a relatively adjustable pusher block much narrower over-all than my prior lug, but which still has the capability of firmly and dependably fixing the pusher block in place.

To this end the pusher block is desirably formed with a laterally projecting rib of substantial thickness and rigidity, and the base block is formed with a laterally projecting under-lapping rib which is received fitted against the underface of the pusher block rib. Headed clamping screws, passed through holes in the upper rib and longitudinally extending slots in the lower rib, are threaded at their lower ends into a clamping plate which forces the ribs together.

The lower face of the upper rib and the upper face of the lower rib are formed with numerous parallel ridges which extend in the direction of travel of the conveyor. These ridges are, roughly at least, trapezoidal in cross-section and are designed to fit interdigitally with one another. In referring to the ridges as trapezoidal in form it is not to be understood that a specific configuration of the crown of each ridge is intended, but rather that the ridges instead of being triangular in cross-section are in some way truncated. In other words, the ridges in each instance are more or less flattened on top, but form V-shaped notches between them so that, as they are forced together by the clamping screws, they do not merely interfit but compel local deformations within the elastic limits of the parts.

Other objects and advantages will hereinafter appear.

In the drawing forming part of this specification,

Figure 1:
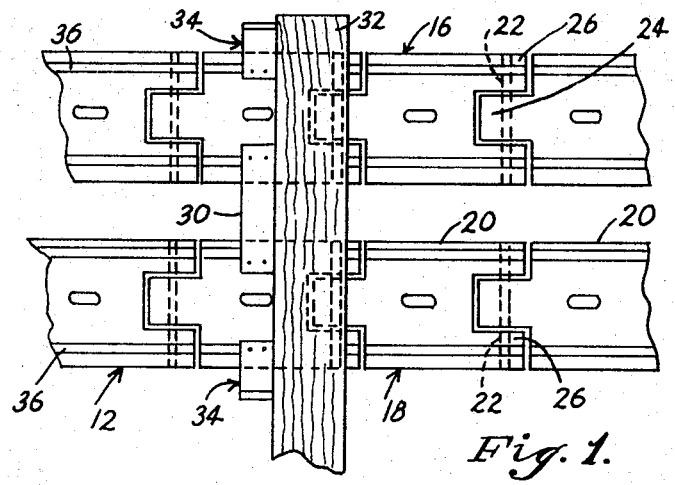
FIG. 1 is a fragmentary plan view of a small introductory portion of the conveyor, which shows a stud scrap being pushed forward by conveyor-carried pusher lugs.
Figure 2:
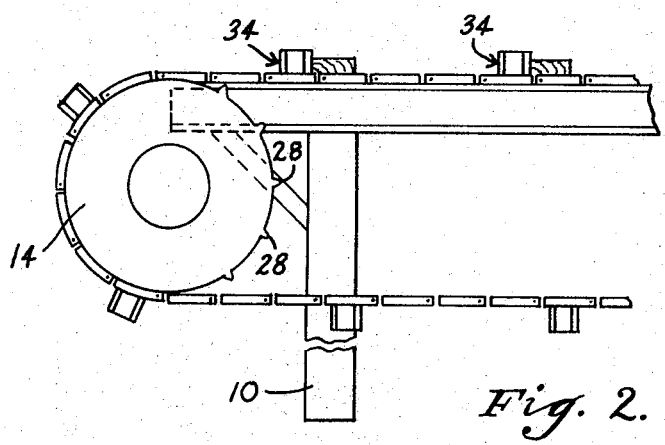
FIG. 2 is a fragmentary view in side elevation of the conveyor on a considerably smaller scale than FIG. 1.
Figure 3:
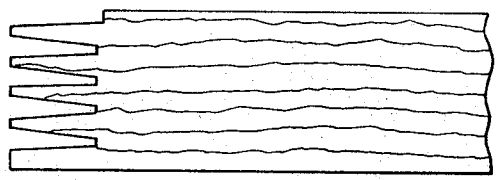
FIG. 3 is a fragmentary edge view in elevation of the left hand end of a slotted stud scrap, it being understood that the right hand end is slotted in a precisely complementary manner.
Figure 4:
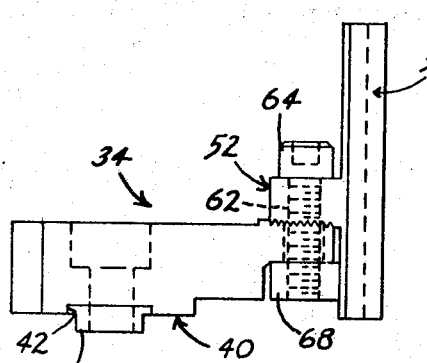
FIG. 4 is a view in front elevation showing a complete pusher lug which is characteristic of the invention.
Figure 5:
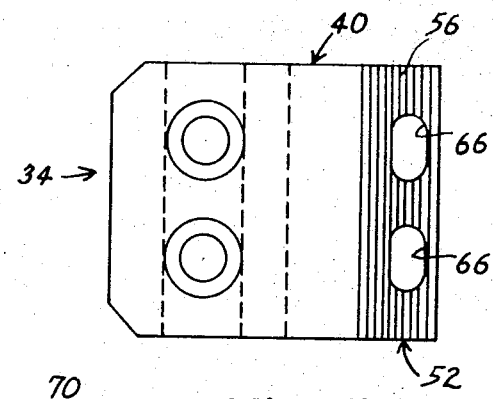
FIG. 5 is a plan view of the lug of FIG. 4.
Figure 6:
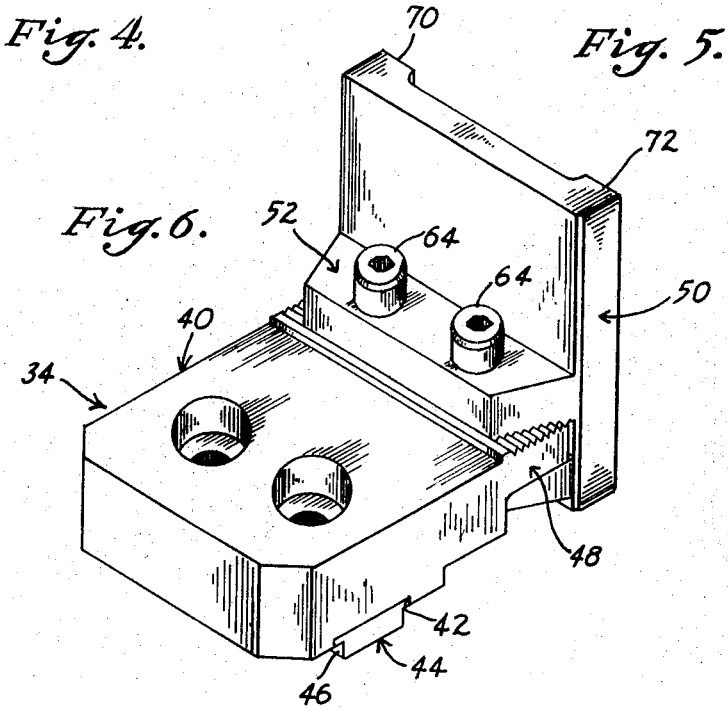
FIG. 6 is a perspective view of the lug of FIGS. 4 and 5.

The conventional illustrative machine includes many details which are not novel and which are of only incidental interest in connection with the present invention. The general organization, purpose and mode of operation of the illustrative machine have already been made clear.

The machine comprises a conveyor supporting frame 10 upon which the active run of a plural chain conveyor 12 is supported. The chain conveyor runs upon drive sprockets (not shown) at the delivery end of the conveyor and similar idler sprockets 14 at the introductory end of the conveyor. The chains are kept taut by conventional means, not shown.

The chain conveyor 12 includes parallel link chains 16 and 18, which are composed, respectively, of links 20 and connecting pins 22. As shown, each link has a trailing ear 24, which fits between two forward ears 26 of its following neighbor. A pin 22 is passed through the three aligned ears 26,24,26 and upset at its ends to retain it in operative relation to the associated link ears. Sprocket teeth 28, of the drive sprockets, engage in cooperative grooved formations (not shown) in the underfaces of the links.

Selected pairs of links (every fourth pair as illustratively shown) are rigidly connected to one another by crossbars 30, which, themselves, serve as fixed pusher lugs for stud scraps 32. Each member of a crossbar connected pair of links is provided with my adjustable lugs 34, which lugs are replacements or substitutes for the unsatisfactory adjustable lugs of the heretofore conventional machine.

As I have shown the chain links 18, every link is formed in its upper surface with two key-ways 36 but only the outer key-ways of the crossbar connected links are used for the mounting of pusher lugs. The leading faces of the pusher members of the novel lugs 34 (FIGS. 4 to 7) must be precisely aligned with the pusher surface of the associated crossbar 30 (or a fixed pusher lug carried on or forming part of the crossbar), and it is important that they dependably hold such alignment. It is not essential that a stud scrap be pushed by three aligned lugs (although most of them are) but it is desirable to be able to handle and utilize scraps which are so short that they extend only from the center pusher to one or the other of the adjustable side lugs.

Each of the improved lugs 34 comprises a base member 40 which is adapted to be firmly and fixedly attached to a chain link with its leading surface located a short distance in back of the fixed center pusher surface of the crossbar 30. In the prior art lug the base member included a shallow fore-and-aft extending, integral rib which fitted into a slot 36 of the associated chain link.

In my improved lug, as in the case of the lug of my earlier filed application, the undersurface of the base member is formed with a shallow fore-and-aft extending channel 42, and a shallow destructible key 44, desirably of aluminum or other material having physical characteristics similar to those of aluminum, is snugly fitted in the channel. The key 44 includes a lower rib 46 which is adapted to fit into a key-way 36 of the associated chain link 18. The key-way 36 determines the lateral location of the base member of the lug, and the angular disposition of the base member.

Headed screws (not shown) have their shanks passed downward through the base member 40 and the key 44, and threaded into the bases of the slots 36 in the associated links. This does not involve any alteration of the chain links, but it does substitute a destructible, readily replaceable key for the integral rib previously provided on the lower side of the base member.

The base member 40 includes a raised horizontal rib 48 of substantial width and thickness along one of its side margins, while the upright pusher member 50 has a side horizontal rib 52 of about the same length, width and thickness as the rib 48, which is adapted for firm and dependable adjustable connection to the rib 48.

Figure 7:
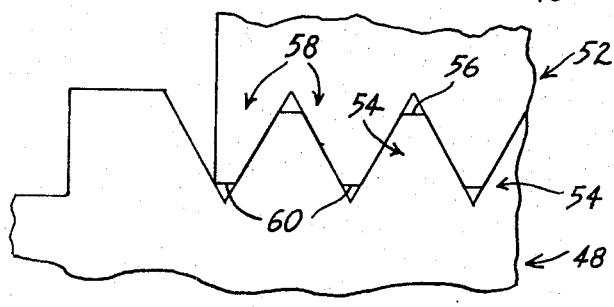
FIG. 7 is an enlarged detail view showing particularly the configuration and relationship of the interfitted ridges and valleys of the base and pusher members of a lug.

To this end the upper surface of the rib 48 is formed with numerous, parallel identical ridges 54 which are of trapezoidal shape in cross-section, the adjacent sloping faces of the ridges forming V-shaped channels where they meet at their bases but terminating at their upper ends, in the form shown best in FIG. 7, in flat crowns 56.

The undersurface of the rib 52 is of identical, substantially complementary form, being made to include corresponding parallel, longitudinally extending ridges 58 on its lower face which have flat crowns 60 at their lower extremities. The ridges of the ribs 54 and 48 are designed to be interdigitally fitted to one another, while leaving the pusher member 50 capable variable longitudinal adjustment relative to the base member 40.

The rib 52 is formed with widely spaced bores 62 through which the shanks of headed Allen screws 64 may be passed freely. The shanks of the screws also pass freely through longitudinally extending slots 66 which are formed in the rib 52 and are threaded at their lower ends into a clamping plate 68.

When the desired location of the pusher member 50 is determined, the screws 64 are tightened. This causes the undersurfaces of the screw heads to be pressed down hard against the upper surface of rib 52, and the upper surface of the clamping plate 68 to be pressed forcefully against the lower face of rib 48.

The reason for terminating the ridges in flattened crowns is to avoid distributing the pressure evenly. In any structure of this kind, there are bound to be minor deviations of structure. By truncating the ridges, the pressure is concentrated on confronting sloping surfaces of the ridges and irregularities can be deformed and caused to interpenetrate without exceeding the elastic limit of the material. In consequence, very firm and dependable interconnection can be established in any selected relationship of adjustment.

The point is emphasized that the overlapping ribs 48 and 52 provide this firm intergripping action in a very narrow space, widthwise of the conveyor, thus making the present lug acceptable in circumstances where the lug of my earlier filed application could not be used.

As in my earlier application the pusher member 60 is formed with external vertical ribs 70 and 72 along its front and rear edges. When the lug is used on the right hand side of a conveyor, the rib 70 leads. It serves the useful purpose, as pointed out in my prior application, of supporting the right hand end of the pushed stud scrap nearer than would otherwise be feasible to the teeth of the right hand saw, and this without requiring the saw to slice into the member 50 throughout the full length of the member 50. When the lug is used on the left side of the conveyor the rib 72 takes over the function of rib 70 as described above, Thus, the lug as shown and described is adapted for use on either side of the conveyor.

Figure 8:
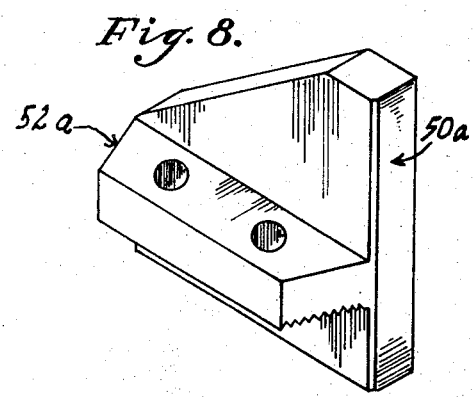
FIG. 8 is a perspective view of a modified form of pusher member.

It is usual in machines of the type which require the narrow lugs of the present application to locate successive lugs exceptionally close to one another. In order to avoid the awkwardness of this limited spacing, the pusher members of the lugs may advantageously be cut away to provide beveled faces 60 behind their leading ends as shown in FIG. 8. The pusher members of FIG. 8 are in all other respects like the pusher members previously described and corresponding reference characters have been applied with the postscript *a* added to corresponding parts.

I have described what I believe to be the best embodiments of my invention. What I desire to cover by letters patent is set forth in the appended claims.

I claim:

1. A pusher lug adapted for firm and precise effective mounting on a conveyor component in a defined relation to the component widthwise of the conveyor, comprising, in combination,
   a. a base mounting member constructed and arranged for fixed attachment on a conveyor component and having a raised, laterally projecting, longitudinally extending rib, the upper horizontal surface of which is formed with a multiplicity of parallel, essentially identical, minute ridges which meet in V-notches at their bases and extend longitudinally of the conveyor, said rib also including a plurality of spaced, longitudinally aligned, longitudinally extending slots;
   b. a pusher member having a laterally projecting rib whose horizontal undersurface is constructed and arranged to rest upon, to overlap, and to interfit with, the upper ridged surface of the raised rib of the base member, and is correspondingly ridged so that the ridges of the two surfaces may be interdigitally fitted to one another with limited, variable readjustment longitudinally of the conveyor, said laterally projecting rib having longitudinally spaced bores alignable with the respective slots of the raised rib;
   c. a clamping block disposed beneath the raised rib of the base member and having threaded bores spaced for simultaneous alignment with the spaced bores of the pusher-member-rib; and
   d. headed screws each passed freely through a bore of the pusher member rib, and through a slot of the base member rib, and threaded into a bore of the clamping plate.

2. A pusher lug as set forth in claim 1 in which the interfitting ridges of the base member rib and of the pusher member rib are trapezoidal in form, so that the pressure between ribs is borne entirely by sloping lateral faces of the ridges as distinguished from the crowns thereof.

3. A pusher lug as set forth in claim 1 in which the major portion of the upper end of the pusher member behind the leading end thereof is smoothly beveled to provide additional clearance for the introduction of stud scraps.

* * * * *